(12) United States Patent
Shpigelman

(10) Patent No.: US 12,284,100 B2
(45) Date of Patent: Apr. 22, 2025

(54) NETWORK DELAY ESTIMATION

(71) Applicant: MELLANOX TECHNOLOGIES, LTD., Yokneam (IL)

(72) Inventor: Yuval Shpigelman, Netanya (IL)

(73) Assignee: Mellanox Technologies, Ltd., Yokneam (IL)

( * ) Notice: Subject to any disclaimer, the term of this patent is extended or adjusted under 35 U.S.C. 154(b) by 586 days.

(21) Appl. No.: 17/667,609

(22) Filed: Feb. 9, 2022

(65) Prior Publication Data

US 2023/0254229 A1 Aug. 10, 2023

(51) Int. Cl.
*H04L 43/0852* (2022.01)

(52) U.S. Cl.
CPC ................ *H04L 43/0852* (2013.01)

(58) Field of Classification Search
CPC ............ H04L 43/0852; H04L 43/0858; H04L 47/266; H04L 47/12
See application file for complete search history.

(56) References Cited

U.S. PATENT DOCUMENTS

| | | | | |
|---|---|---|---|---|
| 2011/0158253 A1* | 6/2011 | Dukkipati | ............ | H04L 47/283 370/465 |
| 2011/0205895 A1* | 8/2011 | Chen | ...................... | H04L 47/10 370/231 |
| 2013/0083654 A1* | 4/2013 | Lee | ..................... | H04L 43/0852 370/252 |
| 2014/0009200 A1* | 1/2014 | Kay | ........................ | H03F 3/505 327/281 |
| 2014/0355464 A1* | 12/2014 | Hwang | ................... | H04L 63/00 370/252 |

(Continued)

FOREIGN PATENT DOCUMENTS

| | | | | |
|---|---|---|---|---|
| CN | 102318328 B | * | 12/2013 | ............... H04B 3/46 |
| CN | 103686220 A | * | 3/2014 | ............. H04H 20/10 |

(Continued)

OTHER PUBLICATIONS

Kumar et al., "Swift: Delay is Simple and Effective for Congestion Control in the Datacenter," Conference Paper, SIGCOMM '20, Virtual Event, USA, pp. 514-528, Aug. 10-14, 2020.

*Primary Examiner* — Chi H Pham
*Assistant Examiner* — Vladislav Y Agureyev
(74) *Attorney, Agent, or Firm* — Meitar Patents Ltd.; Daniel Kligler

(57) ABSTRACT

In one embodiment, data communication device includes a network interface to receive first packets over a network from another network device via a switch, which includes a buffer associated with a variable buffer delay, and packet processing circuitry to compute respective measures of delay over the network to the other network device over time responsively to the received first packets, find a minimum measure of delay over the network to the other network device responsively to at least some of the computed respective measures of delay, estimate a current measure of buffer delay of the buffer responsively to the found minimum measure of delay and a current one of the computed respective measures of delay, set a packet processing parameter responsively to the estimated current measure of buffer delay, and process second packets responsively to the set packet processing parameter.

22 Claims, 3 Drawing Sheets

(56) References Cited

U.S. PATENT DOCUMENTS

| | | | | |
|---|---|---|---|---|
| 2015/0117250 | A1* | 4/2015 | Hwang | H04L 41/147 |
| | | | | 370/253 |
| 2016/0315841 | A1* | 10/2016 | Kang | H04L 47/283 |
| 2016/0330012 | A1* | 11/2016 | Liu | H04L 43/087 |
| 2017/0195238 | A1* | 7/2017 | Luo | H04L 47/2441 |
| 2019/0036788 | A1* | 1/2019 | Gupta | H04L 41/147 |
| 2019/0044874 | A1* | 2/2019 | Zhang | H04L 47/12 |
| 2019/0068512 | A1* | 2/2019 | Papaloukopoulos | |
| | | | | H04L 41/145 |
| 2020/0314035 | A1* | 10/2020 | Gwock | H04L 43/08 |
| 2021/0297362 | A1* | 9/2021 | Eckert | H04L 47/32 |
| 2021/0345277 | A1* | 11/2021 | Wigren | H04W 56/0045 |
| 2022/0022088 | A1* | 1/2022 | Gebert | H04L 43/0858 |
| 2022/0150171 | A1* | 5/2022 | Matthews | H04L 47/20 |
| 2023/0012394 | A1* | 1/2023 | Vaner | H04L 47/30 |
| 2023/0020399 | A1* | 1/2023 | Singh | H04L 65/60 |

FOREIGN PATENT DOCUMENTS

| | | | | |
|---|---|---|---|---|
| CN | 105357138 A | * | 2/2016 | |
| CN | 106162188 A | * | 11/2016 | |
| CN | 108418235 A | * | 8/2018 | H02H 7/268 |
| CN | 110191060 A | * | 8/2019 | |
| CN | 110572333 B | * | 4/2021 | H04L 47/25 |
| CN | 114157377 A | * | 3/2022 | |
| WO | WO-2006056880 A2 | * | 6/2006 | H04L 1/1607 |
| WO | WO-2015004131 A1 | * | 1/2015 | H04N 21/242 |

\* cited by examiner

NETWORK DELAY ESTIMATION

FIELD OF THE INVENTION

The present invention relates to communication systems, and in particular, but not exclusively to, congestion control.

BACKGROUND

When multiple nodes, also referred to as sending nodes, want to send packets to the same destination (or receiving) node over a network via a switch, there may be congestion in the switch possibly leading to dropped packets. One congestion control solution includes the switch adding an indication to packets when the switch buffer becomes too full. Upon receiving the packets in a network interface controller (NIC) of the destination node, the NIC sends a notification to NICs of the sending nodes to reduce sending rate, thereby reducing the congestion.

Some systems measure roundtrip, or delay, in the network from a sender to a receiver node to provide an indication of congestion and adjust the sending rate according to delay. For example, if there are N NICs sending to a single NIC, then each NIC will send 1/N of the line rate to avoid congestion. In other words, each of the N NICs may send one packet and wait a period of time to send N−1 packets before sending the next packet, and so on. In this scenario, the switch buffer is statistically never empty due to the NICs not sending in a synchronized manner unless NIC 1 sends, then NIC 2 etc.

A more recent example of congestion control using the roundtrip time or measured delay is described in a paper entitled "Swift: Delay is Simple and Effective for Congestion Control in the Datacenter", by Kumar, et al. The paper describes a congestion control system that assumes that the switch buffer fullness is the order of square root of N. Therefore, the expected delay of sending a packet from a sending NIC to a receiving NIC via the switch is of the order of the reciprocal of the square root of the sending rate. Therefore, based on the measured delay, the sending rate may be adjusted.

SUMMARY

There is provided in accordance with an embodiment of the present disclosure, a data communication device, including a network interface to receive first packets over a network from another network device via a switch, which includes a buffer associated with a variable buffer delay, and packet processing circuitry to compute respective measures of delay over the network to the other network device over time responsively to the received first packets, find a minimum measure of delay over the network to the other network device responsively to at least some of the computed respective measures of delay, estimate a current measure of buffer delay of the buffer responsively to the found minimum measure of delay and a current one of the computed respective measures of delay, set a packet processing parameter responsively to the estimated current measure of buffer delay, and process second packets responsively to the set packet processing parameter.

Further in accordance with an embodiment of the present disclosure, the first packets are indicative of the respective measures of delay over the network to the other network device over time.

Still further in accordance with an embodiment of the present disclosure the first packets include data indicative of the respective measures of delay over the network to the other network device over time.

Additionally in accordance with an embodiment of the present disclosure respective roundtrip times of the first packets are indicative of the respective measures of delay over the network to the other network device over time.

Moreover, in accordance with an embodiment of the present disclosure the current measure of buffer delay is a relative buffer delay between a current buffer delay and a minimum buffer delay of the buffer.

Further in accordance with an embodiment of the present disclosure the packet processing parameter is a transmission parameter, and the packet processing circuitry is configured to transmit the second packets responsively to the transmission parameter.

Still further in accordance with an embodiment of the present disclosure the transmission parameter is a current transmission rate, and the packet processing circuitry is configured to transmit the second packets to the other network device responsively to the current transmission rate.

Additionally in accordance with an embodiment of the present disclosure the packet processing circuitry is configured to adjust a previous transmission rate to the current transmission rate responsively to the estimated current measure of buffer delay.

Moreover, in accordance with an embodiment of the present disclosure the packet processing circuitry is configured to perform congestion control responsively to the transmission parameter.

Further in accordance with an embodiment of the present disclosure the packet processing circuitry is configured to find the minimum measure of delay over the network to the other network device as a local minimum measure of delay responsively to a function describing the respective measures of delay over the network to the other network device over time.

Still further in accordance with an embodiment of the present disclosure the packet processing circuitry is configured to estimate the current measure of the buffer delay of the buffer as a relative delay responsively to the current one of the computed respective measures of delay less the local minimum measure of delay.

Additionally in accordance with an embodiment of the present disclosure the packet processing circuitry is configured to estimate the current measure of the buffer delay of the buffer as a relative delay responsively to the current one of the computed respective measures of delay less the found minimum measure of delay.

Moreover, in accordance with an embodiment of the present disclosure, the device includes a network interface controller including the network interface and the packet processing circuitry.

Further in accordance with an embodiment of the present disclosure the packet processing circuitry is configured to compute the respective measures of delay over the network to the other network device over time responsively to respective roundtrip times via the other network device.

Still further in accordance with an embodiment of the present disclosure the packet processing circuitry is configured to compute the respective measures of delay over the network to the other network device over time responsively to one-way delay to the other network device.

There is also provided in accordance with another embodiment of the present disclosure a networking method, including receiving first packets over a network from another network device via a switch, which includes a buffer associated with a variable buffer delay, computing respective measures of delay over the network to the other network device over time responsively to the received first packets, finding a minimum measure of delay over the network to the other network device responsively to at least some of the computed respective measures of delay, estimating a current measure of buffer delay of the buffer responsively to the found minimum measure of delay and a current one of the computed respective measures of delay, setting a packet processing parameter responsively to the estimated current measure of buffer delay, and processing second packets responsively to the set packet processing parameter.

Additionally in accordance with an embodiment of the present disclosure the current measure of buffer delay is a relative buffer delay between a current bullet delay and a minimum buffer delay of the buffer.

Moreover, in accordance with an embodiment of the present disclosure the packet processing parameter is a transmission parameter, the processing including transmitting the second packets responsively to the transmission parameter.

Further in accordance with an embodiment of the present disclosure the transmission parameter is a current transmission rate, the transmitting including transmitting the second packets to the other network device responsively to the current transmission rate.

Still further in accordance with an embodiment of the present disclosure, the method includes adjusting a previous transmission rate to the current transmission rate responsively to the estimated current measure of buffer delay.

Additionally in accordance with an embodiment of the present disclosure, the method includes performing congestion control responsively to the transmission parameter.

Moreover, in accordance with an embodiment of the present disclosure the finding includes finding the minimum measure of delay over the network to the other network device as a local minimum measure of delay responsively to a function describing the respective measures of delay over the network to the other network device over time.

Further in accordance with an embodiment of the present disclosure the estimating includes estimating the current measure of the buffer delay of the buffer as a relative delay responsively to the current one of the computed respective measures of delay less the local minimum measure of delay.

There is also provided in accordance with still another embodiment of the present disclosure a software product, including a non-transient computer-readable medium in which program instructions are stored, which instructions, when read by a central processing unit (CPU), cause the CPU to compute respective measures of delay over a network to another network device over time responsively to received first packets, find a minimum measure of delay over the network to the other network device responsively to at least some of the computed respective measures of delay, estimate a current measure of buffer delay of a buffer of a switch in the network responsively to the found minimum measure of delay and a current one of the computed respective measures of delay, set a packet processing parameter responsively to the estimated current measure of buffer delay, and process second packets responsively to the set packet processing parameter.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
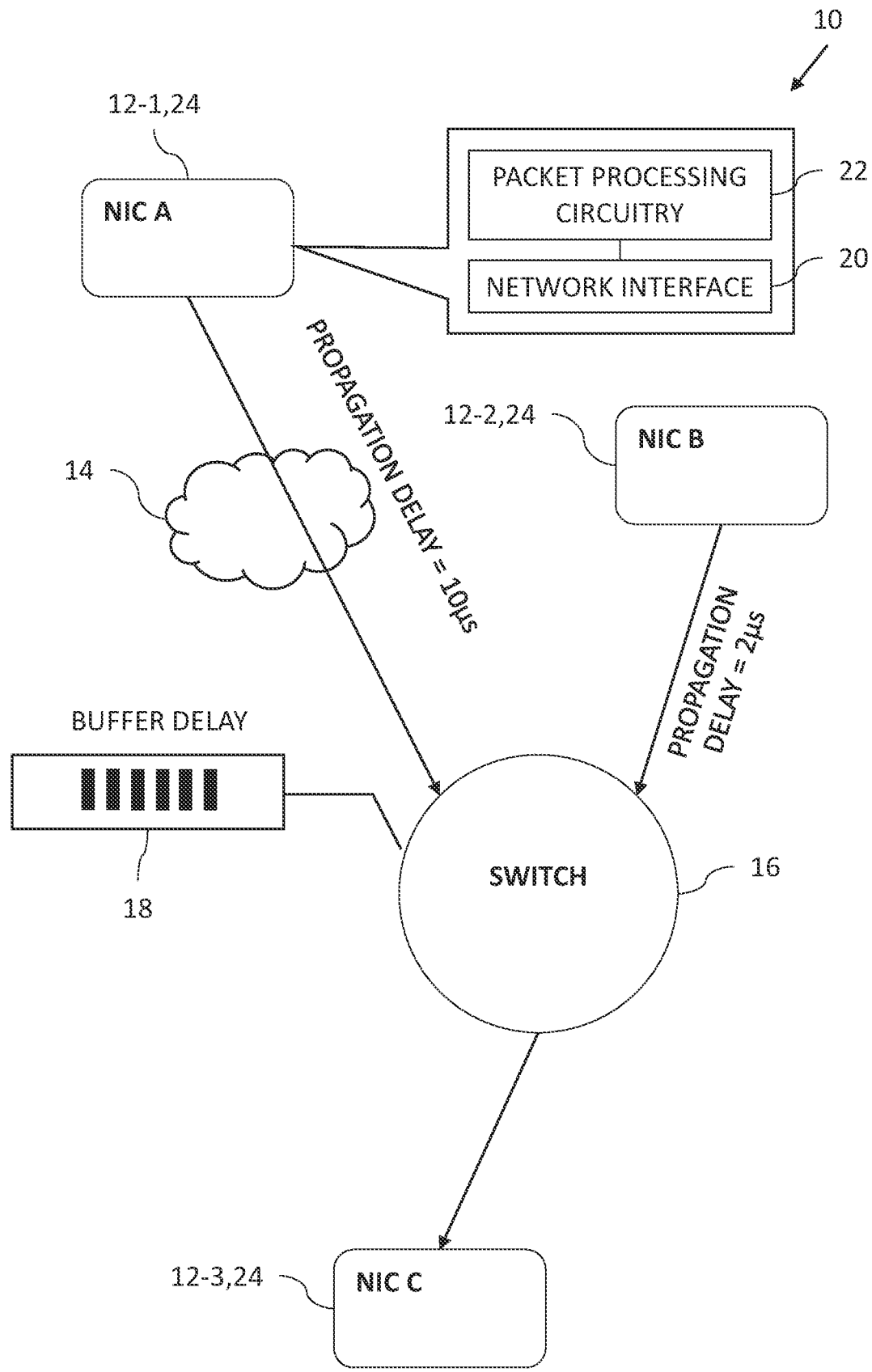
FIG. 1 is a block diagram view of data communication system constructed and operative in accordance with an embodiment of the present invention.

As previously mentioned, the expected delay of sending a packet from a sending NIC to a receiving NIC via a switch may be in the order of the reciprocal of the square root of the sending rate. Therefore, based on the measured delay, the sending rate may be adjusted.

The above solution computes the sending rate based on the total delay (e.g., round trip delay) between the sending MC and receiving NIC. However, total delay also includes propagation delay in the network related to the position of the sending NIC in the cluster or network, and the topology of the network, for example, due to other switches in the network. Therefore, the total delay is not an accurate indicator of the delay due to the buffer of the switch as the total delay also includes propagation delay mentioned above. Without knowing the propagation delay, sending NICs closer to the receiving NIC will generally measure lower delay than sending NICs further away from the receiving MC. This causes network unfairness. Therefore, if there are two NICs sending packets, a first NIC measuring more delay and the second NIC measuring less, the first NIC will send packets at a lower rate than the second NIC leading to unfairness, even though both sending NICs are sending to the same receiving NIC.

Each sending NIC knows what it is sending and the roundtrip time to the receiving NIC. It is also assumed that each sending MC does not know what is happening in the network with respect to other sending NICs in the network sending to the same receiving NIC. Therefore, the delay over the network is generally easy to measure, whereas the buffer level is difficult to measure.

The above problems may occur with any congestion control scheme which is based on network delay to determine the rate at which a NIC should be sending packets. In generally, any system which sets a packet processing parameter based on measured delay over the network may also suffer from similar problems.

One solution is to estimate propagation delay and subtract it from the roundtrip time (RTT). For example, the number of switches over the path in the network could be counted to estimate propagation delay. However, counting the number of switches per path is a hard task, since we need all the switches in the path to do perform this count, or to have a central entity in the network that knows the number of switches in the path in advance.

Therefore, in some embodiments, at least some of the problems are solved by the sending NIC estimating a current measure of buffer delay based on a current measure of delay (from the sending NIC to the receiving NIC) and a minimum measure of delay (found by taking a minimum of many measures of delay from the sending MC to the receiving MC).

In some embodiments, the sending MC receives packets which are indicative of measures of delay over the network to the receiving MC using roundtrip time delay or one-way delay, for example. The sending NIC computes respective measures of delay over the network to the receiving NIC over time responsively to respective ones of the packets. The sending NIC may then find a minimum measure of delay from the computed measures of delay. The minimum measure of delay may be a local minimum.

The current measure of buffer delay may then be estimated by the sending NIC based on the current measure of delay less the (local) minimum measure of delay. The estimated current measure of buffer delay may then be used to set a packet processing parameter such as a transmission parameter (e.g., transmission rate) with which to process packets and thereby provide congestion control in the network and in the switch.

The estimate of the current measure of buffer delay may be estimated as a relative delay between the current measure of buffer delay and the local minimum buffer delay, as detailed now below.

The local minimum measure of delay=propagation delay from the sending NIC to the receiving NIC+the local minimum buffer delay       (equation 1).

The current measure of delay=propagation delay from the sending NIC to the receiving NIC+the current measure of buffer delay       (equation 2).

Therefore, the relative delay=current measure of delay−local minimum measure of delay=equation 2−equation 1=current measure of buffer delay−local minimum buffer delay.

The relative delay provides a good estimate of current actual buffer delay.

System Description

Reference is now made to FIG. 1, which is a block diagram view of data communication system 10 constructed and operative in accordance with an embodiment of the present invention. The data communication system 10 may include data communication devices 12 (labeled 12-1, 12-2, 12-3) configured to send and receive packets over a network 14. For the sake of simplicity, it assumed that in FIG. 1 that data communication device 12-1 and data communication device 12-2 are sending packets to (and receiving packets from) data communication device 12-3 over the network 14, which includes a switch 16. The switch 16 includes a buffer 18 with a variable delay depending on the number of packets stored in the buffer 18.

Therefore, the delay from one of the data communication devices 12-1, 12-2 to the data communication device 12-3 is comprised of propagation delay across the network, plus buffer delay in the buffer 18 of the switch 16.

In the example of FIG. 1, at a given moment in time, the propagation delay between data communication device 12-1 and data communication device 12-3 is 10 μs, and the propagation delay between data communication device 12-1 and data communication device 12-3 is 2 μs. Therefore, if the respective sending rates of data communication device 12-1 and data communication device 12-2 are computed based on the respective delays (i.e., propagation delay plus buffer delay), the data communication device 12-1 would send packets to the data communication device 12-3 at a much slower rate than the data communication device 12-2, even though the buffer delay (of the buffer 18 of the switch 16) is the same for both data communication devices 12-1, 12-2.

Each data communication device 12 includes a network interface 20 and packet processing circuitry 22. Each data communication device 12 may include a network interface controller 24 comprising the network interface 20 and the packet processing circuitry 22.

Figure 2:
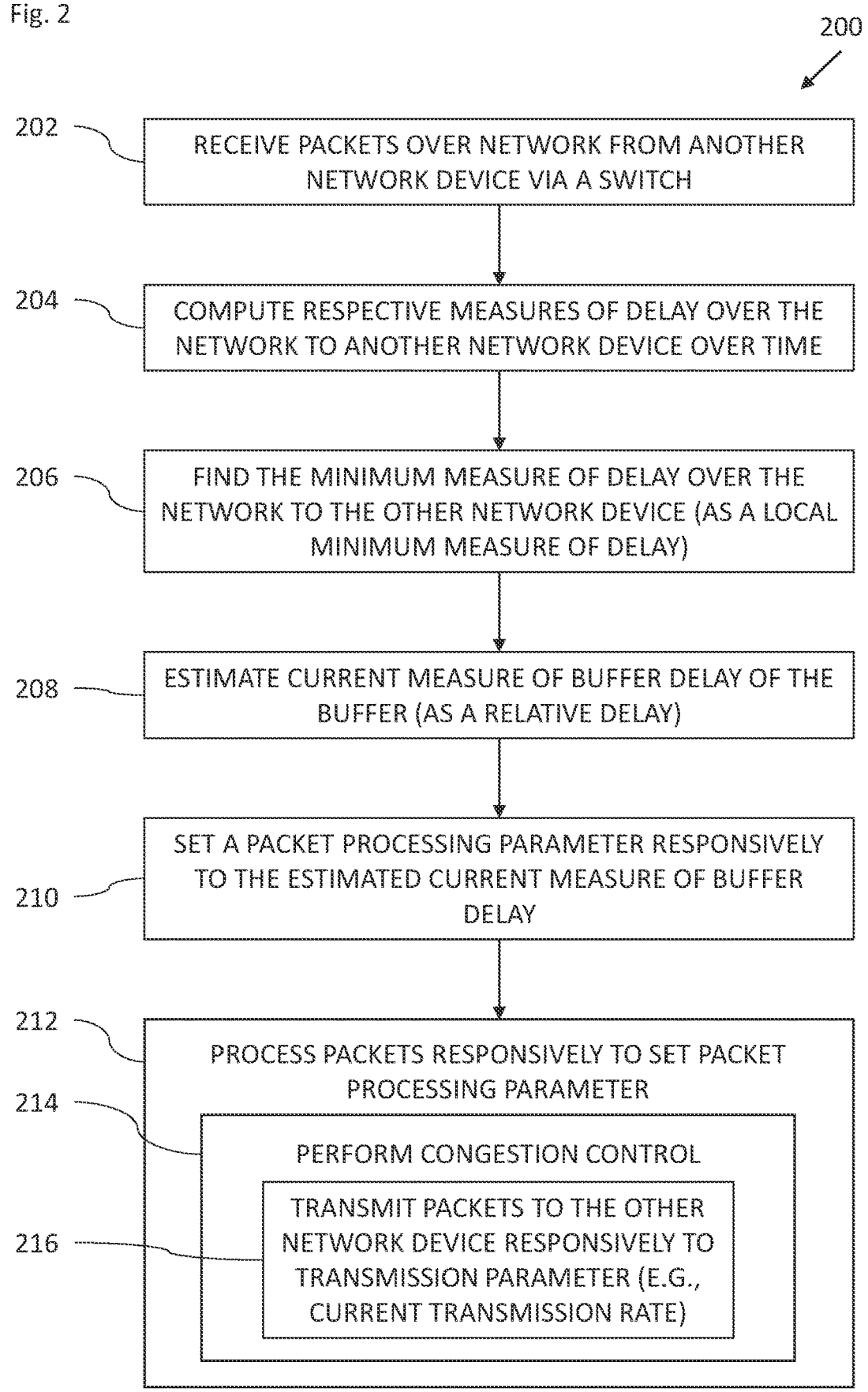
FIG. 2 is a flowchart including steps in a method of operation of the system of FIG. 1.

Reference is now made to FIG. 2, which is a flowchart 200 including steps in a method of operation of the system 10 of FIG. 1. The method described with reference to FIG. 2 is described with reference to any one of the sending data communication devices 12 such as data communication device 12-1 and data communication device 12-2. For the sake of simplicity, it is assumed that the device referred to below is data communication device 12-1 unless mentioned otherwise.

Data communication device 12-1 may be configured to measure delay or roundtrip time from the data communication device 12-1 to another network device (e.g., the data communication device 12-3) via the switch 16). There are different methods to perform the delay or roundtrip time measurements. One method includes the data communication device 12-1 sending a data packet to the other network device and receiving an acknowledgement (ACK) packet from the other network device. Another method includes the data communication device 12-1 sending a dedicated packet to the other network device, which sends that packet back to the data communication device 12-1. Therefore, network interface 20 is configured to receive packets over the network 14 from another network device (e.g., the data communication device 12-3) via the switch 16 (block 202) related to delay or roundtrip time measurement. The packet processing circuitry 22 is configured to compute respective measures of delay over the network 14 to the other network device over time responsively to the received packets (block 204).

Figure 3:
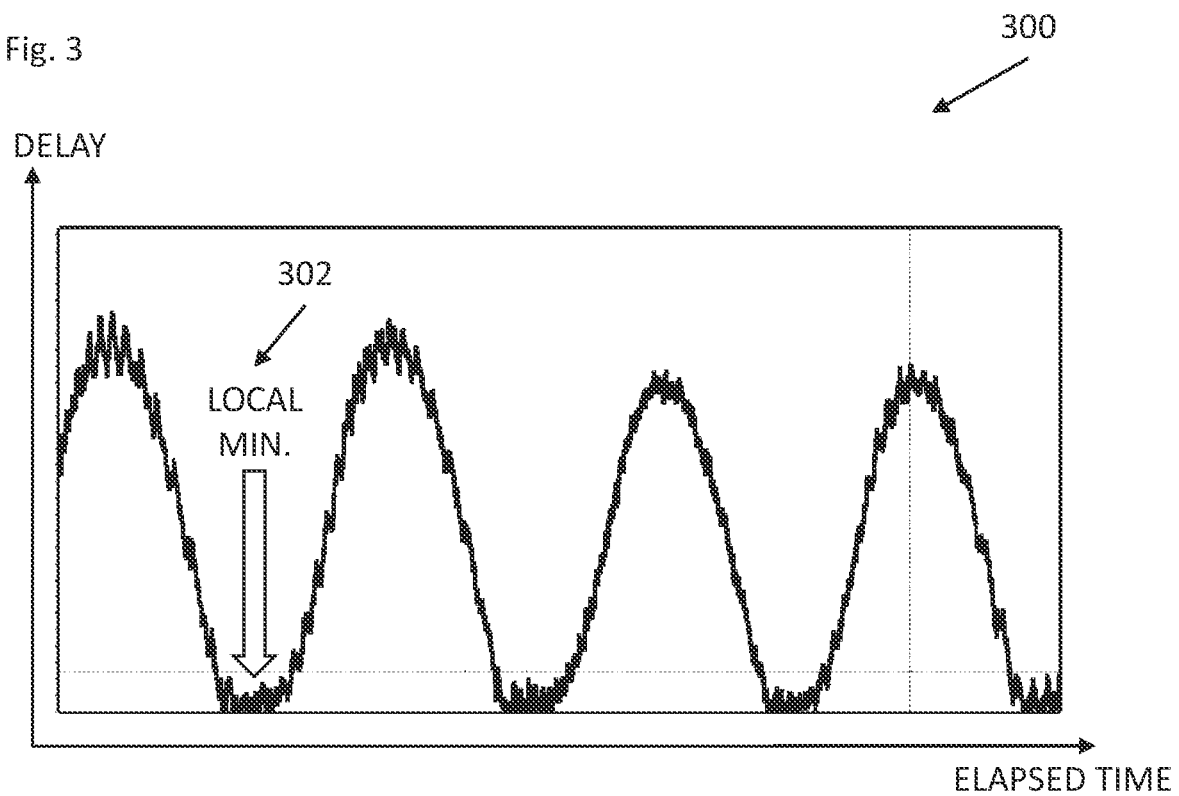
FIG. 3 is a graph of delay against elapsed time.

Reference is now made to FIG. 3, which is a graph 300 of delay against elapsed time. The graph 300 shows that the computed measures of delay from the data communication device 12-1 to the other network device over time with minimum and maximums. In FIG. 3, new delay measurements are plotted on the graph 300 on the left-hand side of the graph 300. A local minimum 302 is indicated on the graph 300.

Reference is again made to FIG. 2. In some embodiments, the received packets are indicative of the respective measures of delay over the network 14 to the other network device over time. In some embodiments, the received packets comprise data (e.g., timestamps) indicative of the respective measures of delay over the network 14 to the other network device over time. In some embodiments, the packet processing circuitry 22 is configured to compute the respective measures of delay over the network 14 to the other network device over time responsively to one-way delay to the other network device.

In some embodiments, respective roundtrip times of the received packets are indicative of the respective measures of delay over the network 14 to the other network device over time. Therefore, the packet processing circuitry 22 is configured to compute the respective measures of delay over the network 14 to the other network device over time responsively to respective roundtrip times via the other network device (i.e., from the data communication device 12-1 to the other network device and back to the data communication device 12-1).

The packet processing circuitry 22 is configured to find a minimum measure of delay over the network 14 to the other network device responsively to at least some of the computed respective measures of delay (block 206). In some embodiments, the packet processing circuitry 22 is configured to find the minimum measure of delay over the network 14 to the other network device as a local minimum measure of delay (arrow 302 in FIG. 3) responsively to a function (e.g., the graph 300) describing the respective measures of delay over the network 11 to the other network device over time.

In some embodiments, the packet processing circuitry 22 uses a local minimum instead of global minimum. The local minimum is the minimum measure of delay in the most recent cycle (e.g., buffer cycle) of the graph 300 or function. One reason to use the local minimum instead of a global minimum is that the global minimum may never occur for one or more of the data communication devices 12. Additionally, the global minimum may be very high for flows that commence after the congestion started. However, if the local minimum is used then all the data communication devices 12 should be aligned to the same minimum after a short period of time (e.g., within one cycle of the graph 300). Every cycle, the most recent local minimum is new and is used by the packet processing circuitry 22 in the steps described below.

The packet processing circuitry 22 is configured to estimate a current measure of buffer delay of the buffer 18 responsively to the found minimum measure of delay (found in the step of block 206) and a current computed respective measure of delay (block 208).

The estimate of the current measure of buffer delay may be expressed as a relative delay between the current measure of buffer delay and the (local) minimum buffer delay of the buffer 18, as detailed now below.

The local minimum measure of delay=propagation
delay from the sending data communication
device 12 to the receiving data communication
device 12+the local minimum buffer delay (equation 1).

The current measure of delay=propagation delay
from the sending data communication device 12
to the receiving data communication device
12+the current measure of buffer delay (equation 2).

Therefore, the relative delay=current measure of
delay−local minimum measure of
delay=equation 2−equation 1=current measure
of buffer delay−local minimum buffer delay.

The relative delay provides a good estimate of current actual buffer delay.

Therefore, in some embodiments, the packet processing circuitry 22 is configured to estimate the current measure of the buffer delay of the buffer 18 as a relative delay responsively to the current computed measure of delay less the found minimum measure of delay, which may equal the local minimum measure of delay.

The packet processing circuitry 22 is configured to set a packet processing parameter responsively to the estimated current measure of buffer delay (block 210). In some embodiments, the packet processing parameter 22 is a transmission parameter. In some embodiments, the transmission parameter is a current transmission rate with which to send packets. For example, the transmission rate may be set as a function of the relative delay.

In some embodiments, the packet processing circuitry 22 may be configured to adjust a previous transmission rate to the current transmission rate responsively to the estimated current measure of buffer delay. For example, if the relative delay increases, the transmission rate may be reduced, and if the relative delay decreases, the transmission rate may be increased.

The packet processing circuitry 22 is configured to process packets responsively to the set packet processing parameter (block 212).

In some embodiments, the packet processing circuitry 22 is configured to perform congestion control responsively to the transmission parameter (block 214). The step of block 214 may include the packet processing circuitry 22 being configured to transmit packets responsively to the transmission parameter (block 216). In some embodiments, the packet processing circuitry 22 is configured to transmit packets to the other network device responsively to the current transmission rate.

In practice, some or all of the functions of the packet processing circuitry 22 may be combined in a single physical component or, alternatively, implemented using multiple physical components. These physical components may comprise hard-wired or programmable devices, or a combination of the two. In some embodiments, at least some of the functions of the packet processing circuitry 22 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. Data communication device, comprising:
a network interface to receive first packets over a network from another network device via a switch, which includes a buffer associated with a variable buffer delay; and
packet processing circuitry to:
compute respective measures of delay over the network to the other network device over time responsively to the received first packets;
find a minimum measure of delay over the network to the other network device as a local minimum measure of delay responsively to; at least some of the computed respective measures of delay; and a function describing the respective measures of delay over the network to the other network device over time;
estimate a current measure of buffer delay of the buffer responsively to the found minimum measure of delay and a current one of the computed respective measures of delay;
set a packet processing parameter responsively to the estimated current measure of buffer delay; and
process second packets responsively to the set packet processing parameter.

2. The device according to claim 1, wherein, the first packets are indicative of the respective measures of delay over the network to the other network device over time.

3. The device according to claim 2, wherein the first packets comprise data indicative of the respective measures of delay over the network to the other network device over time.

4. The device according to claim 2, wherein respective roundtrip times of the first packets are indicative of the respective measures of delay over the network to the other network device over time.

5. The device according to claim 1, wherein the current measure of buffer delay is a relative buffer delay between a current buffer delay and a minimum buffer delay of the buffer.

6. The device according to claim 1, wherein:
the packet processing parameter is a transmission parameter; and
the packet processing circuitry is configured to transmit the second packets responsively to the transmission parameter.

7. The device according to claim 6, wherein:
the transmission parameter is a current transmission rate; and
the packet processing circuitry is configured to transmit the second packets to the other network device responsively to the current transmission rate.

8. The device according to claim 7, wherein the packet processing circuitry is configured to adjust a previous transmission rate to the current transmission rate responsively to the estimated current measure of buffer delay.

9. The device according to claim 6, wherein the packet processing circuitry is configured to perform congestion control responsively to the transmission parameter.

10. The device according to claim 1, wherein the packet processing circuitry is configured to estimate the current measure of the buffer delay of the buffer as a relative delay responsively to the current one of the computed respective measures of delay less the local minimum measure of delay.

11. The device according to claim 1, wherein the packet processing circuitry is configured to estimate the current measure of the buffer delay of the buffer as a relative delay responsively to the current one of the computed respective measures of delay less the found minimum measure of delay.

12. The device according to claim 1, further comprising a network interface controller comprising the network interface and the packet processing circuitry.

13. The device according to claim 1, wherein the packet processing circuitry is configured to compute the respective measures of delay over the network to the other network device over time responsively to respective roundtrip times via the other network device.

14. The device according to claim 1, wherein the packet processing circuitry is configured to compute the respective measures of delay over the network to the other network device over time responsively to one-way delay to the other network device.

15. A networking method, comprising:
receiving first packets over a network from another network device via a switch, which includes a buffer associated with a variable buffer delay;
computing respective measures of delay over the network to the other network device over time responsively to the received first packets;
finding a minimum measure of delay over the network to the other network device as a local minimum measure of delay responsively to; at least some of the computed respective measures of delay; and a function describing the respective measures of delay over the network to the other network device over time;
estimating a current measure of buffer delay of the buffer responsively to the found minimum measure of delay and a current one of the computed respective measures of delay;
setting a packet processing parameter responsively to the estimated current measure of buffer delay; and
processing second packets responsively to the set packet processing parameter.

16. The method according to claim 15, wherein the current measure of buffer delay is a relative buffer delay between a current buffer delay and a minimum buffer delay of the buffer.

17. The method according to claim 15, wherein the packet processing parameter is a transmission parameter, the processing including transmitting the second packets responsively to the transmission parameter.

18. The method according to claim 17, wherein the transmission parameter is a current transmission rate, the transmitting including transmitting the second packets to the other network device responsively to the current transmission rate.

19. The method according to claim 18, further comprising adjusting a previous transmission rate to the current transmission rate responsively to the estimated current measure of buffer delay.

20. The method according to claim 17, further comprising performing congestion control responsively to the transmission parameter.

21. The method according to claim 15, wherein the estimating includes estimating the current measure of the buffer delay of the buffer as a relative delay responsively to the current one of the computed respective measures of delay less the local minimum measure of delay.

22. A software product, comprising a non-transient computer-readable medium in which program instructions are stored, which instructions, when read by a central processing unit (CPU), cause the CPU to:
compute respective measures of delay over a network to another network device over time responsively to received first packets;
find a minimum measure of delay over the network to the other network device as a local minimum measure of delay responsively to; at least some of the computed respective measures of delay; and a function describing the respective measures of delay over the network to the other network device over time;
estimate a current measure of buffer delay of a buffer of a switch in the network responsively to the found minimum measure of delay and a current one of the computed respective measures of delay;
set a packet processing parameter responsively to the estimated current measure of buffer delay; and
process second packets responsively to the set packet processing parameter.

* * * * *